US011001716B2

(12) United States Patent
Goodwin et al.

(10) Patent No.: US 11,001,716 B2
(45) Date of Patent: May 11, 2021

(54) SURFACE APPLIED CORROSION INHIBITOR

(71) Applicant: Construction Research & Technology GmbH, Trostberg (DE)

(72) Inventors: Frederick R Goodwin, Beachwood, OH (US); Olivia R Cromwell, Iselin, NJ (US)

(73) Assignee: Construction Research & Technology GmbH, Trostberg (DE)

( * ) Notice: Subject to any disclaimer, the term of this patent is extended or adjusted under 35 U.S.C. 154(b) by 158 days.

(21) Appl. No.: 16/083,822

(22) PCT Filed: Mar. 13, 2017

(86) PCT No.: PCT/EP2017/055811
§ 371 (c)(1),
(2) Date: Sep. 10, 2018

(87) PCT Pub. No.: WO2017/157836
PCT Pub. Date: Sep. 21, 2017

(65) Prior Publication Data
US 2019/0092948 A1 Mar. 28, 2019

Related U.S. Application Data

(60) Provisional application No. 62/309,119, filed on Mar. 16, 2016.

(51) Int. Cl.
| | |
|---|---|
| *C09D 5/08* | (2006.01) |
| *C04B 41/00* | (2006.01) |
| *C04B 41/49* | (2006.01) |
| *C04B 41/64* | (2006.01) |
| *C04B 41/45* | (2006.01) |
| *C04B 111/26* | (2006.01) |
| *C04B 103/61* | (2006.01) |

(52) U.S. Cl.
CPC ............ *C09D 5/086* (2013.01); *C04B 41/009* (2013.01); *C04B 41/4535* (2013.01); *C04B 41/4922* (2013.01); *C04B 41/64* (2013.01); *C04B 2103/61* (2013.01); *C04B 2111/26* (2013.01)

(58) Field of Classification Search
None
See application file for complete search history.

(56) References Cited

U.S. PATENT DOCUMENTS

| | | |
|---|---|---|
| 3,879,206 A | 4/1975 | Nestler et al. |
| 3,890,269 A | 6/1975 | Martin |
| 4,002,800 A | 1/1977 | Nestler et al. |
| 4,153,743 A | 5/1979 | Caramanian |
| 4,310,575 A | 1/1982 | Khayat et al. |
| 4,342,796 A | 8/1982 | Brown et al. |
| 4,460,625 A | 7/1984 | Emmons et al. |
| 4,486,476 A | 12/1984 | Fritsch et al. |
| 4,524,213 A | 6/1985 | Suzuki et al. |
| 4,525,213 A | 6/1985 | Linn |
| 4,632,952 A | 12/1986 | Buehler et al. |
| 4,645,846 A | 2/1987 | DePasquale et al. |
| 4,781,950 A | 11/1988 | Giesing et al. |
| 4,846,886 A | 7/1989 | Fey et al. |
| 4,874,431 A | 10/1989 | Fey et al. |
| 4,973,448 A | 11/1990 | Carlson et al. |
| 4,990,377 A | 2/1991 | Wilson |
| 4,999,249 A | 3/1991 | Deschler et al. |
| 5,051,129 A | 9/1991 | Cuthbert et al. |
| 5,073,195 A | 12/1991 | Cuthbert et al. |
| 5,091,002 A | 2/1992 | Schamberg et al. |
| 5,120,813 A | 6/1992 | Ward, Jr. |
| 5,139,700 A | 8/1992 | Miksic et al. |
| 5,196,054 A | 3/1993 | Schmuck et al. |

(Continued)

FOREIGN PATENT DOCUMENTS

| | | |
|---|---|---|
| EP | 1308428 A2 | 5/2003 |
| EP | 1308428 B1 | 5/2003 |
| EP | 1475360 A1 | 11/2004 |
| EP | 1475360 A1 | 11/2004 |
| EP | 3072858 A1 | 9/2016 |
| EP | 3072858 A1 | 9/2016 |
| WO | WO-2007/051833 A1 | 5/2007 |
| WO | WO 2007/051833 A1 | 5/2007 |

OTHER PUBLICATIONS

Roar Myrdal, "Corrosion inhibitors—State of the art", SINTEF Building and Infrastructure, COIN Project Report No. 22, 2010, 37 pages.

(Continued)

*Primary Examiner* — Kenneth J Stachel

(74) *Attorney, Agent, or Firm* — Curatolo Sidoti Co., LPA; Salvatore A. Sidoti; Floyd Trillis, III

(57) ABSTRACT

A sealer composition for a cementitious substrate, a cementitious structure sealed with the sealer composition, and a method of sealing a steel reinforced cementitious structure with the sealer composition. The sealer composition includes a substantially non-aqueous blend of a first silane, a second silane having a higher molecular weight than the first silane, and a corrosion inhibitor. The corrosion inhibitor is soluble in silane, soluble in solvent-diluted silane, and at least partially soluble in water. The cementitious structure includes a cementitious substrate and the sealer applied to the surface of the substrate and at least partially penetrating into the substrate. The method of sealing a steel reinforced cementitious structure from intrusion of corrosion-causing agents includes applying the sealer to the surface of a steel reinforced cementitious substrate and permitting the sealer composition to penetrate into the substrate to seal the substrate.

30 Claims, No Drawings

(56) References Cited

U.S. PATENT DOCUMENTS

| | | | |
|---|---|---|---|
| 5,205,860 A | 4/1993 | Narula et al. |
| 5,208,311 A | 5/1993 | Schaefer et al. |
| 5,209,775 A | 5/1993 | Bank et al. |
| 5,209,869 A | 5/1993 | Miksic et al. |
| 5,262,089 A | 11/1993 | Bobrowski et al. |
| 5,279,436 A | 1/1994 | Elliott et al. |
| 5,314,533 A | 5/1994 | Goebel et al. |
| 5,320,778 A | 6/1994 | Miksic et al. |
| 5,326,529 A | 7/1994 | Miksic et al. |
| 5,332,525 A | 7/1994 | Miksic et al. |
| 5,344,589 A | 9/1994 | Miksic et al. |
| 5,371,161 A | 12/1994 | Knott |
| 5,401,871 A | 3/1995 | Feldmann-Krane et al. |
| 5,421,866 A | 6/1995 | Stark-Kasley et al. |
| 5,422,141 A | 6/1995 | Hoopes et al. |
| 5,422,187 A | 6/1995 | Miksic et al. |
| 5,429,873 A | 7/1995 | Deusser et al. |
| 5,432,007 A | 7/1995 | Naito |
| 5,458,923 A | 10/1995 | Goebel et al. |
| 5,461,122 A | 10/1995 | Yilgoer et al. |
| 5,521,273 A | 5/1996 | Yilgoer et al. |
| 5,556,915 A | 9/1996 | Suzuki et al. |
| 5,591,818 A | 1/1997 | Standke et al. |
| 5,597,514 A | 1/1997 | Miksic et al. |
| 5,613,988 A | 3/1997 | Spiegler et al. |
| 5,665,155 A | 9/1997 | Hoehner et al. |
| 5,695,551 A | 12/1997 | Buckingham et al. |
| 5,702,509 A | 12/1997 | Pellerite et al. |
| 5,715,945 A | 2/1998 | Chandler |
| 5,720,902 A | 2/1998 | Zefferi et al. |
| 5,750,053 A | 5/1998 | Miksic et al. |
| 5,804,099 A | 9/1998 | Heilen et al. |
| 5,854,145 A | 12/1998 | Chandler et al. |
| 5,855,975 A | 1/1999 | Miksic et al. |
| 5,868,819 A | 2/1999 | Guhde et al. |
| 5,891,977 A | 4/1999 | Dietz et al. |
| 5,894,040 A | 4/1999 | Foley et al. |
| 5,932,757 A | 8/1999 | Standke et al. |
| 5,937,618 A | 8/1999 | Chandler |
| 6,028,160 A | 2/2000 | Chandler et al. |
| 6,033,599 A | 3/2000 | Lozano et al. |
| 6,054,512 A | 4/2000 | Nelson et al. |
| 6,074,470 A | 6/2000 | Fisher et al. |
| 6,103,001 A | 8/2000 | Fisher et al. |
| 6,113,815 A | 9/2000 | Elfersy et al. |
| 6,120,587 A | 9/2000 | Elfersy et al. |
| 6,133,466 A | 10/2000 | Edelmann et al. |
| 6,139,622 A | 10/2000 | Goebel et al. |
| 6,156,929 A | 12/2000 | Chandler et al. |
| 6,166,098 A | 12/2000 | Burkhart et al. |
| 6,174,461 B1 | 1/2001 | Miksic et al. |
| 6,177,584 B1 | 1/2001 | Loewenberg et al. |
| 6,194,596 B1 | 2/2001 | Josten et al. |
| 6,197,384 B1 | 3/2001 | Schubert et al. |
| 6,211,322 B1 | 4/2001 | Doehler et al. |
| 6,221,944 B1 | 4/2001 | Liebeskind et al. |
| 6,251,973 B1 | 6/2001 | Robinson et al. |
| 6,251,989 B1 | 6/2001 | Edelmann et al. |
| 6,268,404 B1 | 7/2001 | Doehler et al. |
| 6,297,331 B1 | 10/2001 | Feldmann-Krane et al. |
| 6,323,356 B1 | 11/2001 | Lowenberg et al. |
| 6,342,101 B1 | 1/2002 | Miksic et al. |
| 6,355,100 B1 | 3/2002 | Hamabe et al. |
| 6,361,871 B1 | 3/2002 | Jenkner et al. |
| 6,402,990 B1 | 6/2002 | Marazzani et al. |
| 6,414,175 B1 | 7/2002 | Burkhart et al. |
| 6,426,150 B1 | 7/2002 | Jenkner et al. |
| 6,444,315 B1 | 9/2002 | Barfurth et al. |
| 6,500,883 B1 | 12/2002 | Mack et al. |
| 6,534,667 B1 | 3/2003 | Standke et al. |
| 6,555,600 B2 | 4/2003 | Sobkin et al. |
| 6,617,415 B1 | 9/2003 | Miksic et al. |
| 6,669,949 B2 | 12/2003 | Kennedy et al. |
| 6,685,766 B2 | 2/2004 | Standke et al. |
| 6,695,897 B1 | 2/2004 | Miksic et al. |
| 6,695,904 B2 | 2/2004 | Burger et al. |
| 6,699,586 B2 | 3/2004 | Edelmann et al. |
| 6,713,186 B1 | 3/2004 | Jenkner et al. |
| 6,727,375 B2 | 4/2004 | Steding et al. |
| 6,730,749 B1 | 5/2004 | Burkhart et al. |
| 6,734,271 B2 | 5/2004 | Reusmann |
| 6,764,615 B2 | 7/2004 | Miksic et al. |
| 6,784,272 B2 | 8/2004 | Mack et al. |
| 6,800,594 B2 | 10/2004 | Miksic et al. |
| 6,824,607 B2 | 11/2004 | Baeuml et al. |
| 6,846,852 B2 | 1/2005 | Allen et al. |
| 6,846,865 B2 | 1/2005 | Panz et al. |
| 6,858,663 B2 | 2/2005 | Knott et al. |
| 6,893,495 B2 | 5/2005 | Korth et al. |
| 6,995,280 B2 | 2/2006 | Korth et al. |
| 7,014,694 B1 | 3/2006 | Miksic et al. |
| 7,026,398 B2 | 4/2006 | Monkiewicz et al. |
| 7,048,873 B1 | 5/2006 | Miksic et al. |
| 7,053,166 B2 | 5/2006 | Brehm et al. |
| 7,081,157 B2 | 7/2006 | Maze et al. |
| 7,083,828 B2 | 8/2006 | Mueller et al. |
| 7,105,233 B2 | 9/2006 | Bechthold et al. |
| 7,118,615 B1 | 10/2006 | Miksic et al. |
| 7,118,619 B2 | 10/2006 | Brandt et al. |
| 7,125,441 B1 | 10/2006 | Furman et al. |
| 7,175,916 B2 | 2/2007 | Ikuta et al. |
| 7,186,768 B2 | 3/2007 | Korth et al. |
| 7,241,391 B1 | 7/2007 | Miksic et al. |
| 7,264,707 B1 | 9/2007 | Furman et al. |
| 7,297,191 B1 | 11/2007 | Miksic et al. |
| 7,361,777 B2 | 4/2008 | Herrwerth et al. |
| 7,427,442 B2 | 9/2008 | Albert et al. |
| 7,462,221 B2 | 12/2008 | Korth et al. |
| 7,491,274 B2 | 2/2009 | Carey et al. |
| 7,501,534 B2 | 3/2009 | Korth et al. |
| 7,541,089 B1 | 6/2009 | Miksic et al. |
| 7,588,820 B2 | 9/2009 | Berg et al. |
| 7,606,884 B2 | 10/2009 | Palmer et al. |
| 7,686,884 B2 | 3/2010 | Wombacher et al. |
| 7,781,520 B2 | 8/2010 | Standke et al. |
| 7,931,747 B2 | 4/2011 | Weyershausen et al. |
| 8,012,543 B2 | 9/2011 | Mader et al. |
| 8,236,918 B2 | 8/2012 | Mueh et al. |
| 8,431,646 B2 | 4/2013 | Giessler-Blank et al. |
| 9,758,431 B2 | 9/2017 | Campeol et al. |
| 9,828,297 B2 | 11/2017 | Hirokami |
| 9,856,400 B2 | 1/2018 | Fish et al. |
| 2002/0195590 A1 | 12/2002 | Miksic et al. |
| 2003/0101898 A1* | 6/2003 | Standke ............... C04B 24/42 106/14.41 |
| 2003/0181565 A1 | 9/2003 | Panz et al. |
| 2006/0156960 A1* | 7/2006 | Wombacher ......... C07F 9/2408 106/724 |
| 2006/0204767 A1 | 9/2006 | Albert et al. |
| 2006/0269760 A1 | 11/2006 | Sugama |
| 2008/0090069 A1 | 4/2008 | Walters et al. |
| 2008/0131594 A1 | 6/2008 | Cho et al. |
| 2008/0245999 A1* | 10/2008 | Poppe ................. C08K 5/5333 252/183.11 |
| 2009/0218545 A1* | 9/2009 | Mader .................. C23F 11/142 252/389.32 |
| 2010/0015339 A1 | 1/2010 | Morillo et al. |
| 2016/0280611 A1* | 9/2016 | Hirokami ............ C04B 41/4905 |

OTHER PUBLICATIONS

Satyanarayana, et al., "Novel molecular approach using triazine inhibitor to control corrosion and limit chloride ion penetration in steel reinforced concrete", Corrosion Engineering, Science and Technology, vol. 47, issue 1, 2012, pp. 38-44.

International Preliminary Report on Patentability, PCT/EP2017/055811 dated Sep. 18, 2018.

PCT/EP2017/055811—International Search Report, dated May 24, 2017.

PCT/EP2017/055811—International Written Opinion, dated May 24, 2017.

(56) References Cited

OTHER PUBLICATIONS

Roar Myrdal: "Corrosion Inhibitors—State of the art", COIN Project Report; 22, 2010, XP055372383, Oslo, Norway ISBN: 978-82-536-1168-6.

M G V Satyanarayana, et al.: "Novel molecular approach using triazine inhibitor to control corrosion and limit chloride ion penetration in steel reinforced concrete", Corrosion Engineering, Science and Technology, vol. 47, No. 1, Feb. 26, 2012, pp. 38-44, XP055372392, GB ISSN: 1478-422X, DOI: 10.1179/1743278211Y.0000000015. Abstract.

* cited by examiner

SURFACE APPLIED CORROSION INHIBITOR

CROSS REFERENCE TO RELATED APPLICATIONS

This application is a national stage application under 35 U.S.C. § 371 of International Application No. PCT/EP2017/055811, filed 13 Mar. 2017, which claims the benefit of the filing date under 35 U.S.C. § 119(e) from U.S. Provisional Application Patent Ser. No. 62/309,119, filed 16 Mar. 2016, both of which applications are incorporated herein by reference in their entireties.

BACKGROUND

Corrosion is a naturally occurring phenomenon commonly defined as the deterioration of a substance (usually a metal) or its properties as a result of a reaction with its environment. Like other natural hazards such as earthquakes or severe weather disturbances, corrosion can cause dangerous and expensive damage to wastewater systems, pipelines, bridges, roadways and public buildings.

Corrosion is a tremendous problem and cost to society. In 2001, as part of the Transportation Equity Act for the 21st Century, the United States Congress mandated a comprehensive study to provide cost estimates and national strategies to minimize the impact of corrosion. The study was conducted by CC Technologies Laboratories, Inc. of Dublin, Ohio with support from NACE International—The Corrosion Society and the United States Federal Highway Administration (FHWA). This study titled "Corrosion Cost And Preventive Strategies In The United States" is a comprehensive reference on the economic impact of corrosion, estimated at the time to be a staggering annual cost of $276 billion. According to the study, reported to the Office Of Infrastructure Research and Development, corrosion and metal wastage arising from oxidation as caused by exposure to the elements and reactivity between dissimilar materials costs many segments of the United States economy billions of dollars every year. The study covered a large number of economic sectors, including the transportation infrastructure, electric power industry, conveyance and storage. It has now been estimated that the annual cost of corrosion in the United States has grown to $400 billion. NACE International also published a study titled "International Measures of Prevention, Application and Economics of Corrosion Technologies Study" on Mar. 1, 2016. The NACE study examined the global impact of corrosion, the role of corrosion management in industry and government and, attempts to establish best practices for corrosion management through the life cycle of assets.

At the time of the study, the indirect cost of corrosion was conservatively estimated to be equal to the direct cost, giving a total direct plus indirect cost of more than $600 billion or 6 percent of GDP. It has now been estimated that the annual total direct plus indirect cost is more than $800 billion. This cost is considered to be a conservative estimate since only well-documented costs were used in the study. In addition to causing severe damage and threats to public safety, corrosion disrupts operations and requires extensive repair and replacement of failed assets.

The U.S. Federal Highway Administration has rated almost 200,000 bridges, or one of every three bridges in the U.S., as structurally deficient or functionally obsolete. Furthermore, more than one-fourth of all bridges are over 50 years old, the average design-life of a bridge.

The road and bridge infrastructure in the United States is crumbling, with thousands of bridges rated as unsafe and in need of replacement or major repairs. In many of these cases, corrosion plays a significant role in undermining safety. Corrosion protection measures could help minimize or avoid further problems. Steps are being taken to address America's aging infrastructure. For example, House bill H.R. 1682, the "Bridge Life Extension Act 2009," introduced in March 2009, would require States to submit a plan for the prevention and mitigation of damage caused by corrosion when seeking federal funds to build a new bridge or rehabilitate an existing bridge.

Many reinforced concrete structures suffer from premature degradation. Concrete embedded steel reinforcement is initially protected from corrosion by the development of a stable oxide film on its surface. This film, or passivation layer, is formed by a chemical reaction between the highly alkaline concrete pore water and the steel. The passivity provided by the alkaline conditions may be destroyed by the presence of chloride. The chloride ions locally de-passivate the metal and promote active metal dissolution. Corrosion of the steel is usually negligible until the chloride ions reach a concentration where corrosion initiates. The threshold concentration depends on a number of factors including, for example, the steel microenvironment, the pore solution pH, the interference from other ions in the pore solution, the electrical potential of the reinforcing steel, the oxygen concentration and ionic mobility. The chloride acts as a catalyst in that it does not get consumed in the corrosion reaction, but remains active to again participate in the corrosion reaction.

The presence of chloride does not have a directly adverse effect on the concrete itself, but does promote corrosion of the steel reinforcement. The corrosion products that form on the steel reinforcement occupy more space than the steel reinforcement causing pressure to be exerted on the concrete from within. This internal pressure builds over time and eventually leads to cracking and spalling of the concrete. Corrosion of the steel reinforcement also reduces the strength of the reinforcing steel and diminishes the load bearing capacity of the concrete structure.

Damage to reinforced concrete structures is caused primarily by the permeation of chloride ions and other corrosion inducing ions through the concrete to the area surrounding the steel reinforcement. There are a number of sources of chlorides including additions to the concrete mix, such as chloride-containing accelerating admixtures. The chloride may also be present in the structure's environment such as marine conditions or de-icing salts. These materials move within concrete only in the presence of liquid water. Liquid water is required for proper hydration of the hydraulic cement used as a binder in concrete. Once sufficient strength and curing have been achieved, liquid water contributes to most deterioration mechanisms of concrete such as those caused by freezing and thawing cycles, alkali aggregate reactions, sulfate attack, and corrosion of steel reinforcement. If the internal humidity of concrete can be reduced, then the rate of these deleterious reactions will decrease.

Because corrosion of steel-reinforced concrete structures presents dangers to human life and is very costly to repair, what is needed are improved systems and methods to protect infrastructure for future generations.

DETAILED DESCRIPTION

A sealer composition for a cementitious substrate, a cementitious structure sealed with the sealer composition, and a method of sealing a steel reinforced cementitious structure is provided. The sealer composition comprises a substantially non-aqueous blend of a first silane, a second silane having a higher molecular weight than the first silane, and a corrosion inhibitor, wherein the corrosion inhibitor is soluble in silane, soluble in solvent-diluted silane, and at least partially soluble in water. The cementitious structure comprises a cementitious substrate and the sealer applied to the surface of the substrate and at least partially penetrating into the substrate. The method of sealing a steel reinforced cementitious structure from intrusion of corrosion-causing agents comprises applying the sealer to the surface of a steel reinforced cementitious substrate and permitting the sealer composition to penetrate into the substrate.

The term "substantially non-aqueous" refers to a sealer composition that does not contain amounts of aqueous components that react with the silanes of the sealer compositions to decrease the flash point and/or increase the volatile organic compound content of the sealer compositions to undesired levels. "Substantially non-aqueous" may refer to embodiments of the sealer compositions that do not contain any intentionally added aqueous components but may include aqueous components from the raw materials. "Substantially non-aqueous" may include sealer compositions that contain 5% or less (v/v), 2.5% or less (v/v), 1% or less (v/v), 0.75% or less (v/v), 0.5% or less (v/v), 0.4% or less (v/v), 0.3% or less (v/v), 0.25% or less (v/v), 0.2% or less (v/v), 0.1% or less (v/v), 0.075% or less (v/v), 0.05% or less (v/v), 0.025% or less, or 0.01% or less (v/v) of aqueous components based on the total volume of the sealer composition, whether or not the aqueous components are intentionally added or are from the raw materials.

A sealer composition for a cementitious substrate is provided, comprising a substantially non-aqueous blend of:
a first silane;
a second silane having a higher molecular weight than said first silane; and
at least one corrosion inhibitor, wherein said corrosion inhibitor is soluble in silane, soluble in solvent-diluted silane, and at least partially soluble in water.

In certain illustrative embodiments, the silanes are selected from alkyl alkoxysilanes, allyl alkoxysilanes, vinyl alkoxysilanes, aryl alkoxysilanes, alkylaryl alkoxysilanes, and blends thereof.

In certain illustrative embodiments, the silanes are selected from alkyl trialkoxysilanes, dialkyl dialkoxysilanes, trialkyl alkoxysilanes, and blend thereof.

In certain embodiments, the silanes may be represented by the general formula (I)

$$(R^1)_a\text{—Si—}(OR^2)_b \quad (I)$$

wherein $R^1$ may be the same or different and is represented by a saturated or unsaturated, branched or unbranched, cyclic or acyclic alkyl or alkenyl radical containing 1 to 20 carbon atoms, or aryl radical or alkylaryl radical containing 6 to 20 carbon atoms, $R^2$ may be the same or different and is represented by a branched or unbranched alkyl radical containing 1 to 6 carbon atoms or an ether radical containing 2 to 6 carbon atoms, and a and b are each integers from 1 to 3, with the provision that a+b=4. $R^1$ may be the same or different when a=2 or a=3, and $R^2$ may be the same or different when b=2 or b=3.

According to certain illustrative embodiments, the silanes are selected from methyl trimethoxysilane, ethyl trimethoxysilane, n-propyl trimethoxysilane, isopropyl trimethoxysilane, n-butyl trimethoxysilane, isobutyl trimethoxysilane, sec-butyl trimethoxysilane, tert-butyl trimethoxysilane, n-pentyl trimethoxysilane, isopentyl trimethoxysilane, neopentyl trimethoxysilane, n-hexyl trimethoxysilane, isohexyl trimethoxysilane, cyclohexyl trimethoxysilane, heptyl trimethoxysilane, n-octyl trimethoxysilane, isooctyl trimethoxysilane, nonyl trimethoxysilane, decyl trimethoxysilane, undecyl trimethoxysilane, dodecyl trimethoxysilane, tetradecyl trimethoxysilane, hexadecyl trimethoxysilane, octadecyl trimethoxysilane, icosyl trimethoxysilane, allyl trimethoxysilane, vinyl trimethoxysilane, phenyl trimethoxysilane, nonylphenyl trimethoxysilane, methyl triethoxysilane, ethyl triethoxysilane, n-propyl triethoxysilane, isopropyl triethoxysilane, n-butyl triethoxysilane, isobutyl triethoxysilane, sec-butyl triethoxysilane, tert-butyl triethoxysilane, n-pentyl triethoxysilane, isopentyl triethoxysilane, neopentyl triethoxysilane, n-hexyl triethoxysilane, isohexyl triethoxysilane, cyclohexyl triethoxysilane, heptyl triethoxysilane, n-octyl triethoxysilane, isooctyl triethoxysilane, nonyl triethoxysilane, decyl triethoxysilane, undecyl triethoxysilane, dodecyl triethoxysilane, tetradecyl triethoxysilane, hexadecyl triethoxysilane, octadecyl triethoxysilane, icosyl triethoxysilane, allyl triethoxysilane, vinyl triethoxysilane, phenyl triethoxysilane, nonylphenyl triethoxysilane, methyl-tris-(2-methoxyethoxy) silane, ethyl-tris-(2-methoxyethoxy) silane, n-propyl-tris-(2-methoxyethoxy) silane, isopropyl-tris-(2-methoxyethoxy) silane, n-butyl-tris-(2-methoxyethoxy) silane, isobutyl-tris-(2-methoxyethoxy) silane, sec-butyl-tris-(2-methoxyethoxy) silane, tert-butyl-tris-(2-methoxyethoxy) silane, n-pentyl-tris-(2-methoxyethoxy) silane, isopentyl-tris-(2-methoxyethoxy) silane, neopentyl-tris-(2-methoxyethoxy) silane, n-hexyl-tris-(2-methoxyethoxy) silane, isohexyl-tris-(2-methoxyethoxy) silane, cyclohexyl-tris-(2-methoxyethoxy) silane, heptyl-tris-(2-methoxyethoxy) silane, n-octyl-tris-(2-methoxyethoxy) silane, isooctyl-tris-(2-methoxyethoxy) silane, nonyl-tris-(2-methoxyethoxy) silane, decyl-tris-(2-methoxyethoxy) silane, undecyl-tris-(2-methoxyethoxy) silane, dodecyl-tris-(2-methoxyethoxy) silane, tetradecyl-tris-(2-methoxyethoxy) silane, hexadecyl-tris-(2-methoxyethoxy) silane, octadecyl-tris-(2-methoxyethoxy) silane, icosyl-tris-(2-methoxyethoxy) silane, allyl-tris-(2-methoxyethoxy) silane, vinyl-tris-(2-methoxyethoxy) silane, phenyl-tris-(2-methoxyethoxy) silane, nonylphenyl-tris-(2-methoxyethoxy) silane, methyl-tris-(2-ethoxyethoxy) silane, ethyl-tris-(2-ethoxyethoxy) silane, n-propyl-tris-(2-ethoxyethoxy) silane, isopropyl-tris-(2-ethoxyethoxy) silane, n-butyl-tris-(2-ethoxyethoxy) silane, isobutyl-tris-(2-ethoxyethoxy) silane, sec-butyl-tris-(2-ethoxyethoxy) silane, tert-butyl-tris-(2-ethoxyethoxy) silane, n-pentyl-tris-(2-ethoxyethoxy) silane, isopentyl-tris-(2-ethoxyethoxy) silane, neopentyl-tris-(2-ethoxyethoxy) silane, n-hexyl-tris-(2-ethoxyethoxy) silane, isohexyl-tris-(2-ethoxyethoxy) silane, cyclohexyl-tris-(2-ethoxyethoxy) silane, heptyl-tris-(2-ethoxyethoxy) silane, n-octyl-tris-(2-ethoxyethoxy) silane, isooctyl-tris-(2-ethoxyethoxy) silane, nonyl-tris-(2-ethoxyethoxy) silane, decyl-tris-(2-ethoxyethoxy) silane, undecyl-tris-(2-ethoxyethoxy) silane, dodecyl-tris-(2-ethoxyethoxy) silane, tetradecyl-tris-(2-ethoxyethoxy) silane, hexadecyl-tris-(2-ethoxyethoxy) silane, octadecyl-tris-(2-ethoxyethoxy) silane, icosyl-tris-(2-ethoxyethoxy) silane, allyl-tris-(2-ethoxyethoxy) silane, vinyl-tris-(2-ethoxyethoxy) silane, phenyl-tris-(2-ethoxyethoxy) silane, nonylphenyl-tris-(2-ethoxyethoxy) silane, dimethyl dimethoxysilane, diethyl dimethoxysilane, di-n-propyl dimethoxysilane, di-isopropyl dimethoxysilane, di-n-butyl dimethoxysilane, di-isobutyl dimethoxysilane, di-sec-butyl dimethoxysilane, di-tert-butyl dimethoxysilane, butylmethyl dimethoxysilane, butylethyl dimethoxysilane, butylpropyl dimethoxysilane, di-n-pentyl dimethoxysilane, di-isopentyl dimethoxysilane, di-neopentyl dimethoxysilane, di-n-hexyl dimethoxysilane, di-isohexyl dimethoxysilane, di-cyclohexyl dimethoxysilane, cyclohexylmethyl dimethoxysilane, cyclohexylethyl dimethoxysilane, hexylmethyl dimethoxysilane, hexylethyl dimethoxysilane, diheptyl dimethoxysilane, di-n-octyl dimethoxysilane, di-isooctyl dimethoxysilane, dinonyl dimethoxysilane, di-decyl dimethoxysilane, di-undecyl dimethoxysilane, di-dodecyl dimethoxysilane, di-tetradecyl dimethoxysilane, di-hexadecyl dimethoxysilane, di-octadecyl dimethoxysilane, di-icosyl dimethoxysilane, di-allyl dimethoxysilane, di-vinyl dimethoxysilane, di-phenyl dimethoxysilane, di-nonylphenyl dimethoxysilane, dimethyl diethoxysilane, diethyl diethoxysilane, di-n-propyl diethoxysilane, di-isopropyl diethoxysilane, di-n-butyl diethoxysilane, di-isobutyl diethoxysilane, di-sec-butyl diethoxysilane, di-tert-butyl diethoxysilane, butylmethyl diethoxysilane, butylethyl diethoxysilane, butylpropyl diethoxysilane, di-n-pentyl diethoxysilane, di-isopentyl diethoxysilane, di-neopentyl diethoxysilane, di-n-hexyl diethoxysilane, di-isohexyl diethoxysilane, di-cyclohexyl diethoxysilane, cyclohexylmethyl diethoxysilane, cyclohexylethyl diethoxysilane, hexylmethyl diethoxysilane, hexylethyl diethoxysilane, diheptyl diethoxysilane, di-n-octyl diethoxysilane, di-isooctyl diethoxysilane, dinonyl diethoxysilane, di-decyl diethoxysilane, di-undecyl diethoxysilane, di-dodecyl diethoxysilane, di-tetradecyl diethoxysilane, di-hexadecyl diethoxysilane, di-octadecyl diethoxysilane, di-icosyl diethoxysilane, di-allyl diethoxysilane, di-vinyl diethoxysilane, di-phenyl diethoxysilane, di-nonylphenyl diethoxysilane, dimethyl-bis-(2-methoxyethoxy) silane, diethyl-bis-(2-methoxyethoxy) silane, di-n-propyl-bis-(2-methoxyethoxy) silane, di-isopropyl-bis-(2-methoxyethoxy) silane, di-n-butyl-bis-(2-methoxyethoxy) silane, di-isobutyl-bis-(2-methoxyethoxy) silane, di-sec-butyl-bis-(2-methoxyethoxy) silane, di-tert-butyl-bis-(2-methoxyethoxy) silane, butylmethyl-bis-(2-methoxyethoxy) silane, butylethyl-bis-(2-methoxyethoxy) silane, butylpropyl-bis-(2-methoxyethoxy) silane, di-n-pentyl-bis-(2-methoxyethoxy) silane, di-isopentyl-bis-(2-methoxyethoxy) silane, di-neopentyl-bis-(2-methoxyethoxy) silane, di-n-hexyl-bis-(2-methoxyethoxy) silane, di-isohexyl-bis-(2-methoxyethoxy) silane, di-cyclohexyl-bis-(2-methoxyethoxy) silane, cyclohexylmethyl-bis-(2-methoxyethoxy) silane, cyclohexylethyl-bis-(2-methoxyethoxy) silane, hexylmethyl-bis-(2-methoxyethoxy) silane, hexylethyl-bis-(2-methoxyethoxy) silane, diheptyl-bis-(2-methoxyethoxy) silane, di-n-octyl-bis-(2-methoxyethoxy) silane, di-isooctyl-bis-(2-methoxyethoxy) silane, dinonyl-bis-(2-methoxyethoxy) silane, di-decyl-bis-(2-methoxyethoxy) silane, di-undecyl-bis-(2-methoxyethoxy) silane, di-dodecyl-bis-(2-methoxyethoxy) silane, di-tetradecyl-bis-(2-methoxyethoxy) silane, di-hexadecyl-bis-(2-methoxyethoxy) silane, di-octadecyl-bis-(2-methoxyethoxy) silane, di-icosyl-bis-(2-methoxyethoxy) silane, di-allyl-bis-(2-methoxyethoxy) silane, di-vinyl-bis-(2-methoxyethoxy) silane, di-phenyl-bis-(2-methoxyethoxy) silane, di-nonylphenyl-bis-(2-methoxyethoxy) silane, dimethyl-bis-(2-ethoxyethoxy) silane, diethyl-bis-(2-ethoxyethoxy) silane, di-n-propyl-bis-(2-ethoxyethoxy) silane, di-isopropyl-bis-(2-ethoxyethoxy) silane, di-n-butyl-bis-(2-ethoxyethoxy) silane, di-isobutyl-bis-(2-ethoxyethoxy) silane, di-sec-butyl-bis-(2-ethoxyethoxy) silane, di-tert-butyl-bis-(2-ethoxyethoxy) silane, butylmethyl-bis-(2-ethoxyethoxy) silane, butylethyl-bis-(2-ethoxyethoxy) silane, butylpropyl-bis-(2-ethoxyethoxy) silane, di-n-pentyl-bis-(2-ethoxyethoxy) silane, di-isopentyl-bis-(2-ethoxyethoxy) silane, di-neopentyl-bis-(2-ethoxyethoxy) silane, di-n-hexyl-bis-(2-ethoxyethoxy) silane, di-isohexyl-bis-(2-ethoxyethoxy) silane, di-cyclohexyl-bis-(2-ethoxyethoxy) silane, cyclohexylmethyl-bis-(2-ethoxyethoxy) silane, cyclohexylethyl-bis-(2-ethoxyethoxy) silane, hexylmethyl-bis-(2-ethoxyethoxy) silane, hexylethyl-bis-(2-ethoxyethoxy) silane, diheptyl-bis-(2-ethoxyethoxy) silane, di-n-octyl-bis-(2-ethoxyethoxy) silane, di-isooctyl-bis-(2-ethoxyethoxy) silane, dinonyl-bis-(2-ethoxyethoxy) silane, di-decyl-bis-(2-ethoxyethoxy) silane, di-undecyl-bis-(2-ethoxyethoxy) silane, di-dodecyl-bis-(2-ethoxyethoxy) silane, di-tetradecyl-bis-(2-ethoxyethoxy) silane, di-hexadecyl-bis-(2-ethoxyethoxy) silane, di-octadecyl-bis-(2-ethoxyethoxy) silane, di-icosyl-bis-(2-ethoxyethoxy) silane, di-allyl-bis-(2-ethoxyethoxy) silane, di-vinyl-bis-(2-ethoxyethoxy) silane, di-phenyl-bis-(2-ethoxyethoxy) silane, di-nonylphenyl-bis-(2-ethoxyethoxy) silane, trimethyl methoxysilane, triethyl methoxysilane, tri-n-propyl methoxysilane, tri-isopropyl methoxysilane, tri-n-butyl methoxysilane, tri-isobutyl methoxysilane, tri-sec-butyl methoxysilane, tri-tert-butyl methoxysilane, tri-n-pentyl methoxysilane, tri-isopentyl methoxysilane, tri-neopentyl methoxysilane, tri-n-hexyl methoxysilane, tri-isohexyl methoxysilane, tri-cyclohexyl methoxysilane, tri-heptyl methoxysilane, tri-n-octyl methoxysilane, tri-isooctyl methoxysilane, tri-nonyl methoxysilane, tri-decyl methoxysilane, tri-undecyl methoxysilane, tri-dodecyl methoxysilane, tri-tetradecyl methoxysilane, tri-hexadecyl methoxysilane, tri-octadecyl methoxysilane, tri-icosyl methoxysilane, tri-allyl methoxysilane, tri-vinyl methoxysilane, tri-phenyl methoxysilane, tri-nonylphenyl methoxysilane, trimethyl ethoxysilane, triethyl ethoxysilane, tri-n-propyl ethoxysilane, tri-isopropyl ethoxysilane, tri-n-butyl ethoxysilane, tri-isobutyl ethoxysilane, tri-sec-butyl ethoxysilane, tri-tert-butyl ethoxysilane, tri-n-pentyl ethoxysilane, tri-isopentyl ethoxysilane, tri-neopentyl ethoxysilane, tri-n-hexyl ethoxysilane, tri-isohexyl ethoxysilane, tri-cyclohexyl ethoxysilane, tri-heptyl ethoxysilane, tri-n-octyl ethoxysilane, tri-isooctyl ethoxysilane, tri-nonyl ethoxysilane, tri-decyl ethoxysilane, tri-undecyl ethoxysilane, tri-dodecyl ethoxysilane, tri-tetradecyl ethoxysilane, tri-hexadecyl ethoxysilane, tri-octadecyl ethoxysilane, tri-icosyl ethoxysilane, tri-allyl ethoxysilane, tri-vinyl ethoxysilane, tri-phenyl ethoxysilane, tri-nonylphenyl ethoxysilane, trimethyl-(2-methoxyethoxy) silane, triethyl-(2-methoxyethoxy) silane, tri-n-propyl-(2-methoxyethoxy) silane, tri-isopropyl-(2-methoxyethoxy) silane, tri-n-butyl-(2-methoxyethoxy) silane, tri-isobutyl-(2-methoxyethoxy) silane, tri-sec-butyl-(2-methoxyethoxy) silane, tri-tert-butyl-(2-methoxyethoxy) silane, tri-n-pentyl-(2-methoxyethoxy) silane, tri-isopentyl-(2-methoxyethoxy) silane, tri-neopentyl-(2-methoxyethoxy) silane, tri-n-hexyl-(2-methoxyethoxy) silane, tri-isohexyl-(2-methoxyethoxy) silane, tri-cyclohexyl-(2-methoxyethoxy) silane, tri-heptyl-(2-methoxyethoxy) silane, tri-n-octyl-(2-methoxyethoxy) silane, tri-isooctyl-(2-methoxyethoxy) silane, tri-nonyl-(2-methoxyethoxy) silane, tri-decyl-(2-methoxyethoxy) silane, tri-undecyl-(2-methoxyethoxy) silane, tri-dodecyl-(2-methoxyethoxy) silane, tri-tetradecyl-(2-methoxyethoxy) silane, tri-hexadecyl-(2-methoxyethoxy) silane, tri-octadecyl-(2-methoxyethoxy) silane, tri-icosyl-(2-methoxyethoxy) silane, tri-allyl-(2-methoxyethoxy) silane, tri-vinyl-(2-methoxyethoxy) silane, tri-phenyl-(2-methoxyethoxy) silane, tri-nonylphenyl-(2-methoxyethoxy) silane, trimethyl-(2-ethoxyethoxy) silane, triethyl-(2-ethoxyethoxy) silane, tri-n-propyl-(2-ethoxyethoxy) silane, tri-isopropyl-(2-ethoxyethoxy) silane, tri-n-butyl-(2-ethoxyethoxy) silane, tri-isobutyl-(2-ethoxyethoxy) silane, tri-sec-butyl-(2- ethoxyethoxy) silane, tri-tert-butyl-(2-ethoxyethoxy) silane, tri-n-pentyl-(2-ethoxyethoxy) silane, tri-isopentyl-(2-ethoxyethoxy) silane, tri-neopentyl-(2-ethoxyethoxy) silane, tri-n-hexyl-(2-ethoxyethoxy) silane, tri-isohexyl-(2-ethoxyethoxy) silane, tri-cyclohexyl-(2-ethoxyethoxy) silane, tri-heptyl-(2-ethoxyethoxy) silane, tri-n-octyl-(2-ethoxyethoxy) silane, tri-isooctyl-(2-ethoxyethoxy) silane, tri-nonyl-(2-ethoxyethoxy) silane, tri-decyl-(2-ethoxyethoxy) silane, tri-undecyl-(2-ethoxyethoxy) silane, tri-dodecyl-(2-ethoxyethoxy) silane, tri-tetradecyl-(2-ethoxyethoxy) silane, tri-hexadecyl-(2-ethoxyethoxy) silane, tri-octadecyl-(2-ethoxyethoxy) silane, tri-icosyl-(2-ethoxyethoxy) silane, tri-allyl-(2-ethoxyethoxy) silane, tri-vinyl-(2-ethoxyethoxy) silane, tri-phenyl-(2-ethoxyethoxy) silane, and tri-nonylphenyl-(2-ethoxyethoxy) silane.

In certain illustrative embodiments, the first silane is selected from alkyl trialkoxysilanes, dialkyl dialkoxysilanes, trialkyl alkoxysilanes, and blend thereof.

In certain illustrative embodiments, the first silane is selected from methyl trimethoxysilane, ethyl trimethoxysilane, n-butyl trimethoxysilane, isobutyl trimethoxysilane, methyl triethoxysilane, ethyl triethoxysilane, n-butyl triethoxysilane, isobutyl triethoxysilane, dimethyl dimethoxysilane, diethyl dimethoxysilane, dimethyl diethoxysilane, diethyl diethoxysilane, and blends thereof.

In certain illustrative embodiments, the first silane is selected from methyl trimethoxysilane, ethyl trimethoxysilane, n-butyl trimethoxysilane, isobutyl trimethoxysilane, methyl triethoxysilane, ethyl triethoxysilane, n-butyl triethoxysilane, isobutyl triethoxysilane, and blends thereof. In certain embodiments, the first silane comprises methyl triethoxysilane. In certain embodiments, the first silane comprises isobutyl triethoxysilane.

In certain illustrative embodiments, the second silane is selected from alkyl trialkoxysilanes, dialkyl dialkoxysilanes, trialkyl alkoxysilanes, and blends thereof.

In certain illustrative embodiments, the second silane is selected from n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, hexadecyl triethoxysilane, cyclohexylmethyl dimethoxysilane, cyclohexylethyl dimethoxysilane, cyclohexylmethyl diethoxysilane, cyclohexylethyl diethoxysilane, and blends thereof.

In certain illustrative embodiments, the second silane is selected from n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, hexadecyl triethoxysilane, and blends thereof. In certain embodiments, the second silane comprises n-octyl triethoxysilane.

In certain embodiments, the first silane comprises isobutyl triethoxysilane, and the second silane comprises n-octyl triethoxysilane.

The molecular weights of the first and second silanes are calculated based on the sum of the atomic weights of the component atoms of the molecule.

In certain embodiments, the molecular weight of the first silane is from about 100 g/mol to about 270 g/mol.

In some embodiments, the molecular weight of the second silane is from about 270 g/mol to about 575 g/mol.

In certain embodiments, the molecular weight of the first silane is from about 100 g/mol to about 270 g/mol, and the molecular weight of the second silane is from about 270 g/mol to about 575 g/mol g/mol.

In some embodiments, the molecular weight of the first silane is from about 150 g/mol to about 250 g/mol, and the molecular weight of the second silane is from about 270 g/mol to about 400 g/mol.

In some embodiments, the molecular weight of the first silane is from about 170 g/mol to about 240 g/mol, and the molecular weight of the second silane is from about 270 g/mol to about 300 g/mol.

In certain embodiments, the sealer composition may comprise a catalyst to facilitate silane reaction. In some embodiments, the catalyst is selected from Lewis acids and Lewis bases.

In some embodiments, the catalyst is selected from organic titanates. In some embodiments, the catalyst is selected from tetraisopropyl titanate, tetra-n-butyl titanate, tetrakis(2-ethylhexyl) titanate, and mixtures thereof.

The reaction of silanes may be catalyzed by tin compounds such as dibutyltin dilaurate, dibutyltin bis(acetylacetonate), di-n-octyltin dilaurate, and di-n-octyl tin di(acetylacetonate).

The penetrating sealer composition includes at least one corrosion inhibitor. By way of illustration, and without limitation, the corrosion inhibitor may be selected from alkyl acetamides, alkyl carboxylic acids and salts, alkoxy carboxylic acids and salts, alkoxylates, phosphorus containing compounds, triazines, and mixtures thereof. In some embodiments, the phosphorus containing compounds may comprise at least one of alkyl phosphonic acids and phosphate esters. In some embodiments, the phosphate esters comprise at least one of polyether phosphates, alkyl phosphate esters, and amine-blocked alkyl phosphate esters.

In certain embodiments, the corrosion inhibitor is selected from dimethyl acetamide, diethyl acetamide, disodium sebacate, iso-nonyl phenoxy acetic acid, ethynylcarbinolalkoxylate, octane phosphonic acid, mono-n-octyl phosphate ester, amine blocked C6-C10 alkyl phosphate monoester, triisobutyl phosphate, polyether phosphate, 1,3,5-Tris[3-(dimethylamino)propyl]hexahydro-1,3,5-triazine, and mixtures thereof.

In certain embodiments, the corrosion inhibitor comprises a blend of ethynylcarbinolalkoxylate and amine blocked C6-C10 alkyl phosphate monoester. In some embodiments, the corrosion inhibitor comprises a blend of dimethyl acetamide and triisobutyl phosphate.

The sealer composition is substantially non-aqueous, comprising a blend of a first silane, a second silane having a higher molecular weight than the first silane, and a corrosion inhibitor, wherein the corrosion inhibitor is soluble in silane, soluble in solvent-diluted silane, and at least partially soluble in water. In some embodiments, the sealer composition may comprise a solvent to facilitate solubility, and the sealer composition may comprise solvent diluted silanes or pure silanes. In certain embodiments the solvent is selected from aliphatic hydrocarbons, aromatic hydrocarbons, ketones, alcohols, and mixtures thereof. In some embodiments the solvent is selected from acetone, methanol, ethanol, isopropanol, and mixtures thereof.

In certain embodiments, the corrosion inhibitor may have solubility in the provided silanes, in solvent diluted silanes, and may also have at least partial water solubility and may be stable in the environment found within pore structures of conventional hydraulic cement based concrete without causing the silanes to react or generate volatile components affecting the flash point and volatile organic compounds (VOCs). According to certain embodiments, the flash point of the sealer composition is 60° C. and greater. While not being bound by theory, the solubility of the corrosion inhibitor may allow it to penetrate along with the silane material during application to the surface of the concrete, and repeated treatments may carry the inhibitor deeper into the concrete where it may remain while no liquid water is present to cause it to diffuse away or wash away. At such time that the silane treated concrete may become pervious to liquid water due to such reasons as cracking, volatility of the reaction product of the alkoxysilanes, or formation of fresh hydrophilic sites from continued hydration of the hydraulic cement in the concrete, liquid water may dissolve the corrosion inhibitor and cause it to be free to move within the concrete. Mobility of the corrosion inhibitor in the liquid water may provide additional corrosion protection at the interface of steel reinforcement and concrete.

Subsequent reapplication of the sealer composition comprising silanes and corrosion inhibitor to cracked concrete may provide the corrosion inhibitor at the tip of the crack to inhibit corrosion reactions.

Solubility of a substance may be defined by the amount of the substance that is miscible in or may be dissolved in a dissolving medium. A substance may be considered soluble if about 3 grams or more may be dissolved in about 100 ml of a dissolving medium. A substance may be considered partially soluble if about 0.01 gram to about 3 grams may be dissolved in about 100 ml of a dissolving medium. A substance may be considered insoluble if less than about 0.01 gram may be dissolved in about 100 ml of a dissolving medium.

Alternatively, a substance may be considered soluble if about 3 grams or more may be dissolved in about 100 grams of a dissolving medium. A substance may be considered partially soluble if about 0.01 gram to about 3 grams may be dissolved in about 100 grams of a dissolving medium. A substance may be considered insoluble if less than about 0.01 gram may be dissolved in about 100 grams of a dissolving medium.

A cementitious structure is provided, comprising: a cementitious substrate; and a penetrating sealer comprising a substantially non-aqueous blend of:
  a first silane;
  a second silane having a higher molecular weight than said first silane; and
  at least one corrosion inhibitor, wherein said corrosion inhibitor is soluble in silane, soluble in solvent-diluted silane, and at least partially soluble in water, said sealer applied to the surface of said cementitious substrate and at least partially penetrating into said substrate.

In certain embodiments, the cementitious substrate of the provided cementitious structure is selected from concrete, masonry, and mortar substrates. In some embodiments, the cementitious substrate is selected from concrete and masonry substrates. In certain embodiments, the cementitious substrate comprises a concrete substrate.

In accordance with certain embodiments, the cementitious substrate may be selected from concrete, masonry, mortar, and the like, and may comprise cementitious materials such as hydraulic cements or mortars, and the like. Alternatively, the cementitious substrate may comprise a matrix that is sufficiently compressible to absorb products of corrosion.

The term "hydraulic cement" is used in its usual sense to denote the class of structural materials which are applied in mixture with water, and thereafter harden or set as a result of physical or chemical changes which consume the water present. In addition to Portland cement, hydraulic cement includes, among others:
  1. Rapid hardening cements, such as those having high alumina contents.
  2. Low-heat cements, characterized by high percentages of dicalcium silicate and tetracalcium alumino ferrite, and low percentages of tricalcium silicate and tricalcium aluminate.
  3. Sulphate resisting cements, characterized by unusually high percentages of tricalcium silicate and dicalcium silicate, and unusually low percentages of tricalcium aluminate and tetracalcium alumino ferrite.
  4. Portland blast-furnace cement comprising a mixture of Portland cement clinker and granulated slag.
  5. Masonry cements, such as mixtures of Portland cement and one or more of the following: hydrated lime, granulated slag, pulverized limestone, colloidal clay, diatomaceous earth or other finely divided forms of silica, calcium stearate and paraffin.
  6. Natural cements as characterized by material obtained from deposits in the Lehigh Valley, U.S.A.
  7. Lime cements, comprising an oxide of calcium in its pure or impure forms, whether or not containing some argillaceous material.
  8. Selenitic cement, characterized by the addition of 5-10% of plaster of Paris to lime.
  9. Pozzolanic cement, comprising the mixture of pozzolan, Portland cement, calcium hydroxide, water, trass kieselguhr, pumice, tufa, santorin earth or granulated slag with lime mortar.
  10. Calcium sulphate cements, characterized by depending on the hydration of calcium sulphate, and including plaster of Paris, Keene's cement and Parian cement.

Suitable non-limiting examples of hydraulic cements include Portland cement, masonry cement, alumina cement, refractory cement, magnesia cements, such as a magnesium phosphate cement, a magnesium potassium phosphate cement, calcium aluminate cement, calcium sulfoaluminate cement, oil well cement, blended slag, fly ash or pozzolan cement, natural cement, hydraulic hydrated lime, and mixtures thereof. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V.

In certain embodiments, the cementitious substrate may comprise mortars which include fine aggregate. The fine aggregates are materials that almost entirely pass through a Number 4 sieve (ASTM C125 and ASTM C33), such as silica sand.

In some embodiments, the cementitious substrate may comprise concretes which include coarse aggregate. The coarse aggregates are materials that are predominantly retained on a Number 4 sieve (ASTM C125 and ASTM C33), such as silica, quartz, crushed marble, glass spheres, granite, limestone, calcite, feldspar, alluvial sands, sands or any other durable aggregate, and mixtures thereof.

In certain embodiments of the provided cementitious structure, the molecular weight of the first silane is from about 100 g/mol to about 270 g/mol. In some embodiments of the provided cementitious structure, the molecular weight of the second silane is from about 270 g/mol to about 575 g/mol.

In certain embodiments of the provided cementitious structure, the molecular weight of the first silane is from about 100 g/mol to about 270 g/mol, and the molecular weight of the second silane is from about 270 g/mol to about 575 g/mol.

In certain embodiments of the provided cementitious structure, the molecular weight of the first silane is from about 150 g/mol to about 250 g/mol, and the molecular weight of the second silane is from about 270 g/mol to about 400 g/mol.

In certain embodiments of the provided cementitious structure, the molecular weight of the first silane is from about 170 g/mol to about 240 g/mol, and the molecular weight of the second silane is from about 270 g/mol to about 300 g/mol.

In certain embodiments of the provided cementitious structure, the first silane is selected from methyl trimethoxysilane, ethyl trimethoxysilane, n-butyl trimethoxysilane, isobutyl trimethoxysilane, methyl triethoxysilane, ethyl triethoxysilane, n-butyl triethoxysilane, isobutyl triethoxysilane, and blends thereof. In certain embodiments, the first silane comprises methyl triethoxysilane. In some embodiments, the first silane comprises isobutyl triethoxysilane.

In certain embodiments of the provided cementitious structure, the second silane is selected from n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, hexadecyl triethoxysilane, and blends thereof. In some embodiments, the second silane comprises n-octyl triethoxysilane.

In certain embodiments of the provided cementitious structure, the first silane comprises isobutyl triethoxysilane, and the second silane comprises n-octyl triethoxysilane.

In certain embodiments of the provided cementitious structure, the corrosion inhibitor may be selected from alkyl acetamides, alkyl carboxylic acids and salts, alkoxy carboxylic acids and salts, alkoxylates, phosphorus containing compounds, triazines, and mixtures thereof. In some embodiments, the phosphorus containing compounds may comprise at least one of alkyl phosphonic acids and phosphate esters. In some embodiments, the phosphate esters comprise at least one of polyether phosphates, alkyl phosphate esters, and amine-blocked alkyl phosphate esters.

In certain embodiments of the provided cementitious structure, the corrosion inhibitor is selected from dimethyl acetamide, diethyl acetamide, disodium sebacate, iso-nonyl phenoxy acetic acid, ethynylcarbinolalkoxylate, octane phosphonic acid, mono-n-octyl phosphate ester, amine blocked C6-C10 alkyl phosphate monoester, triisobutyl phosphate, polyether phosphate, 1,3,5-Tris[3-(dimethylamino)propyl]hexahydro-1,3,5-triazine, and mixtures thereof.

In certain embodiments of the provided cementitious structure, the corrosion inhibitor comprises a blend of ethynylcarbinolalkoxylate and amine blocked C6-C10 alkyl phosphate monoester. In some embodiments of the provided cementitious structure, the corrosion inhibitor comprises a blend of dimethyl acetamide and triisobutyl phosphate.

A method of sealing a steel reinforced cementitious structure from intrusion of corrosion-causing agents is provided, comprising: applying a penetrating sealer comprising a substantially non-aqueous blend of:

a first silane;

a second silane having a higher molecular weight than said first silane; and at least one corrosion inhibitor, wherein said corrosion inhibitor is soluble in silane, soluble in solvent-diluted silane, and at least partially soluble in water, to the surface of a steel reinforced cementitious substrate and permitting the sealer composition to penetrate into the substrate.

In certain embodiments, the cementitious substrate of the cementitious structure of the provided method is selected from concrete, masonry, and mortar substrates. In some embodiments, the cementitious substrate is selected from the group consisting of concrete and masonry substrates. In certain embodiments, the cementitious substrate comprises a concrete substrate.

In certain embodiments of the provided method of sealing a steel reinforced cementitious structure from intrusion of corrosion-causing agents, the molecular weight of the first silane is from about 100 g/mol to about 270 g/mol. In some embodiments of the provided method, the molecular weight of the second silane is from about 270 g/mol to about 575 g/mol.

In certain embodiments of the provided method of sealing a steel reinforced cementitious structure from intrusion of corrosion-causing agents, the molecular weight of the first silane is from about 100 g/mol to about 270 g/mol, and the molecular weight of the second silane is from about 270 g/mol to about 575 g/mol.

In certain embodiments of the provided method of sealing a steel reinforced cementitious structure from intrusion of corrosion-causing agents, the molecular weight of the first silane is from about 150 g/mol to about 250 g/mol, and the molecular weight of the second silane is from about 270 g/mol to about 400 g/mol.

In certain embodiments of the provided method of sealing a steel reinforced cementitious structure from intrusion of corrosion-causing agents, the molecular weight of the first silane is from about 170 g/mol to about 240 g/mol, and the molecular weight of the second silane is from about 270 g/mol to about 300 g/mol.

In certain embodiments of the provided method of sealing a steel reinforced cementitious structure from intrusion of corrosion-causing agents, the first silane is selected from methyl trimethoxysilane, ethyl trimethoxysilane, n-butyl trimethoxysilane, isobutyl trimethoxysilane, methyl triethoxysilane, ethyl triethoxysilane, n-butyl triethoxysilane, isobutyl triethoxysilane, and blends thereof. In certain embodiments, the first silane comprises methyl triethoxysilane. In some embodiments, the first silane comprises isobutyl triethoxysilane.

In certain embodiments of the provided method of sealing a steel reinforced cementitious structure from intrusion of corrosion-causing agents, the second silane is selected from n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, hexadecyl triethoxysilane, and blends thereof. In some embodiments, the second silane comprises n-octyl triethoxysilane.

In certain embodiments of the provided method of sealing a steel reinforced cementitious structure from intrusion of corrosion-causing agents, the first silane comprises methyl triethoxysilane, and the second silane comprises n-octyl triethoxysilane.

In certain embodiments of the provided method of sealing a steel reinforced cementitious structure from intrusion of corrosion-causing agents, the first silane comprises isobutyl triethoxysilane, and the second silane comprises n-octyl triethoxysilane.

In certain embodiments of the provided method of sealing a steel reinforced cementitious structure from intrusion of corrosion-causing agents, the corrosion inhibitor may be selected from alkyl acetamides, alkyl carboxylic acids and salts, alkoxy carboxylic acids and salts, alkoxylates, phosphorus containing compounds, triazines, and mixtures thereof. In some embodiments, the phosphorus containing compounds may comprise at least one of alkyl phosphonic acids and phosphate esters. In some embodiments, the phosphate esters comprise at least one of polyether phosphates, alkyl phosphate esters, and amine-blocked alkyl phosphate esters.

In certain embodiments of the provided method of sealing a steel reinforced cementitious structure from intrusion of corrosion-causing agents, the corrosion inhibitor is selected from dimethyl acetamide, diethyl acetamide, disodium sebacate, iso-nonyl phenoxy acetic acid, ethynylcarbinolalkoxylate, octane phosphonic acid, mono-n-octyl phosphate ester, amine blocked C6-C10 alkyl phosphate monoester, triisobutyl phosphate, polyether phosphate, 1,3,5-Tris[3-(dimethylamino)propyl]hexahydro-1,3,5-triazine, and mixtures thereof.

In certain embodiments of the provided method of sealing a steel reinforced cementitious structure from intrusion of corrosion-causing agents, the corrosion inhibitor comprises a blend of ethynylcarbinolalkoxylate and amine blocked C6-C10 alkyl phosphate monoester. In some embodiments of the provided method of sealing a steel reinforced cementitious structure from intrusion of corrosion-causing agents, the corrosion inhibitor comprises a blend of dimethyl acetamide and triisobutyl phosphate.

In certain embodiments of the provided sealer composition for a cementitious substrate, cementitious structure, and method of sealing a steel reinforced cementitious structure, the sealer composition comprises a substantially non-aqueous blend of three or more silanes having different molecular weights. In certain embodiments, the silanes are selected from methyl trimethoxysilane, ethyl trimethoxysilane, n-butyl trimethoxysilane, isobutyl trimethoxysilane, methyl triethoxysilane, ethyl triethoxysilane, n-butyl triethoxysilane, isobutyl triethoxysilane, dimethyl dimethoxysilane, diethyl dimethoxysilane, dimethyl diethoxysilane, diethyl diethoxysilane, n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, hexadecyl triethoxysilane, cyclohexylmethyl dimethoxysilane, cyclohexylethyl dimethoxysilane, cyclohexylmethyl diethoxysilane, cyclohexylethyl diethoxysilane, and blends thereof.

In some embodiments of the provided sealer composition for a cementitious substrate, cementitious structure, and method of sealing a steel reinforced cementitious structure, the sealer composition comprises a substantially non-aqueous blend of three or more silanes having different molecular weights, selected from methyl trimethoxysilane, ethyl trimethoxysilane, n-butyl trimethoxysilane, isobutyl trimethoxysilane, methyl triethoxysilane, ethyl triethoxysilane, n-butyl triethoxysilane, isobutyl triethoxysilane, n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, hexadecyl triethoxysilane, and blends thereof.

In certain embodiments of the provided sealer composition for a cementitious substrate, cementitious structure, and method of sealing a steel reinforced cementitious structure, the sealer composition comprises a substantially non-aqueous blend of methyl triethoxysilane, isobutyl triethoxysilane, and n-octyl triethoxysilane.

The provided sealer composition for a cementitious substrate, cementitious structure, and method of sealing a steel reinforced cementitious structure provide improved performance in application and reapplication as compared to emulsions or other water-based systems since hydrophobicity repels any water-based materials when reapplied. The provided sealer composition penetrates into previously hydrophobed concrete once the pores are no longer filled with the previous application of sealer, allowing improved performance through multiple iterations of application and reapplication.

EXAMPLES

The below examples are merely illustrative of the penetrating sealer composition, cementitious composition sealed with the penetrating sealer composition, and method of sealing a steel reinforced cementitious structure with the penetrating sealer composition. The illustrative examples do not, and should not be construed to, limit the scope of the claims directed to the penetrating sealer composition, cementitious composition sealed with the penetrating sealer composition, and/or method of sealing a steel reinforced cementitious structure with the penetrating sealer composition in any manner whatsoever.

Anodic Polarization testing demonstrates the improved corrosion performance of the provided sealer compositions compared to a blank control sample with no sealer.

Specimens are prepared by cutting a section of #4 reinforcing steel 5 inches in length, pre-drilling the top of the rebar to allow for a machine screw ($5/32 \times 1/4$ inch) to be tapped, deburring bars to remove sharp edges, rinsing the tapped hole with acetone to remove debris and oil from the tapping operation, inserting an $5/32 \times 1/4$ inch machine screw into the tapped area to prevent abrasive blasting grit from contaminating the hole, abrasive blasting the rebar until the exterior surface is removed and uniformly bright (SSPC-SP 5/NACE No. 1, White Metal Blast Cleaning), using compressed air to remove any residual sand particles, rinsing with acetone and allowing to dry, including thread holes, placing specimens on a clean paper towel to dry, removing machine screws and verifying tapped holes are clean, grease free and of sufficient depth for attachment screws, submerging the rebar in NaOH solution (40 grams per liter of solution, 1 Normal=1 Molar) at 50° C. for 24 hours, using a spacer to maximize solution contact with steel pieces to ensure uniform passivation, rinsing with distilled water followed immediately by acetone to dry, attaching the $5/32 \times 14$ inch machine screw and a solid core electrical wire (14 gauge) to the rebar, using gloves when handling the rebar to prevent finger prints and sweat, dipping or applying by brush a low viscosity epoxy to cover only the 3 inches of the bar with the tapped end and after the low viscosity epoxy has become tacky, applying epoxy to the top 3 inches of the rebar, including the machine screw and all exposed wire, leaving the bottom 2 inches of exposed steel, recoating with epoxy three times until the ends are pinhole free.

Specimens are cast using the following mix design per ASTM C109: 740 grams of cement (TI/II), 2035 grams of ASTM C109 sand, and 359 grams of $H_2O$, mixing in an ASTM C305 mixer using ASTM C109 procedure, casting the mortar in a 2×4 inch cylinder and placing the rebar in the center of the mold, leaving a 1 inch gap from the bottom surface of the cylinder, aligning the bar and filling with mortar, vibrating the specimen until no air is evolved on a vibrating table, covering the cast cylinders with a wet towel in a 1 gallon pail to prevent evaporation, and leaving covered for 24 hours, placing in a moist environment, and after 24 hours, stripping out the specimen and placing it in lime saturated water for 24 hours, removing specimens from lime saturated water, rinsing with tap water and placing in 50% relative humidity for 8 to 10 days with free air circulation on all sides to dry specimens.

The specimens are treated with disclosed sealer composition and subjected to Anodic Polarization testing side-by side with a control specimen that is untreated, monitoring for an increase in current flow. Corrosion resistance in hours for the Anodic Polarization testing is listed for the various examples in Table 1. Irgacor® and Korantin® materials are available from BASF Corporation, Florham Park, N.J.

TABLE 1

Number Of Hours Corrosion Resistance For Anodic Polarization Testing

| Example | | Silanes | Corrosion Inhibitor | Hours |
|---|---|---|---|---|
| 1 | | none | none | 699 |
| 2 | 1/1/1 | methyltriethoxysilane/ isobutyltriethoxysilane/ N-octyltriethoxysilane | none | 2179 |
| 3 | 1/1/1 | methyltriethoxysilane/ isobutyltriethoxysilane/ N-octyltriethoxysilane | 1% Korantin ®SMK alkylphosphate ester | 2261 |
| 4 | 1/1/1 | methyltriethoxysilane/ isobutyltriethoxysilane/ N-octyltriethoxysilane | 1% Korantin ®PP ethynylcarbinolalkoxylate | 2838 |
| 5 | 1/1/1 | methyltriethoxysilane/ isobutyltriethoxysilane/ N-octyltriethoxysilane | 1% Irgacor ®843 formulated disodium sebacate | 2842 |
| 6 | 1/1/1 | methyltriethoxysilane/ isobutyltriethoxysilane/ N-octyltriethoxysilane | 1% Irgacor ®NPA iso-nonyl phenoxy acetic acid | 2928 |
| 7 | 1/1/1 | methyltriethoxysilane/ isobutyltriethoxysilane/ N-octyltriethoxysilane | 1% Korantin ®LUB polyether phosphate | 5000 |
| 8 | 1/1/1 | methyltriethoxysilane/ isobutyltriethoxysilane/ N-octyltriethoxysilane | 2% octane phosphonic acid | 5000 |

While the sealer composition, cementitious structure, and method of sealing a steel reinforced cementitious structure from intrusion of corrosion-causing agents have been described in connection with various illustrative embodiments, it will be understood that the embodiments described herein are merely exemplary, and that one skilled in the art may make variations and modifications without departing from the spirit and scope of the embodiments. All such variations and modifications are intended to be included within the scope of the embodiments as described hereinabove. Further, all embodiments disclosed are not necessarily in the alternative, as various embodiments may be combined to provide the desired result. Therefore, the sealer composition, cementitious structure, and method of sealing a steel reinforced cementitious structure shall not be limited to any single embodiment, but rather construed in breadth and scope in accordance with the recitation of the appended claims.

The invention claimed is:

1. A sealer composition for a cementitious substrate, comprising a substantially non-aqueous blend of:
   a first silane;
   a second silane having a higher molecular weight than said first silane; and
   at least one corrosion inhibitor,
   wherein said corrosion inhibitor is soluble in silane, and soluble in solvent-diluted silane, and at least partially soluble in water, and wherein said corrosion inhibitor comprises a blend of ethynylcarbinolalkoxylate and amine blocked C6-C10 alkyl phosphate monoester.

2. The sealer composition of claim 1, wherein the molecular weight of said first silane is from about 100 g/mol to about 270 g/mol.

3. The sealer composition of claim 1, wherein the molecular weight of said second silane is from about 270 g/mol to about 575 g/mol.

4. The sealer composition of claim 1, wherein the molecular weight of said first silane is from about 150 g/mol to about 250 g/mol, and wherein the molecular weight of said second silane is from about 270 g/mol to about 400 g/mol.

5. The sealer composition of claim 1, wherein the molecular weight of said first silane is from about 100 g/mol to about 270 g/mol, and wherein the molecular weight of said second silane is from about 270 g/mol to about 576 g/mol.

6. The sealer composition of claim 5, wherein said first silane comprises isobutyl triethoxysilane, and wherein said second silane comprises n-octyl triethoxysilane.

7. The sealer composition of claim 5, wherein said first silane is selected from the group consisting of alkyl trialkoxysilanes, dialkyl dialkoxysilanes, and trialkyl alkoxysilanes.

8. The sealer composition of claim 7, wherein said first silane is selected from the group consisting of methyl trimethoxysilane, ethyl trimethoxysilane, n-butyl trimethoxysilane, isobutyl trimethoxysilane, methyl triethoxysilane, ethyl triethoxysilane, n-butyl triethoxysilane, and isobutyl triethoxysilane.

9. The sealer composition of claim 5, wherein said second silane is selected from the group consisting of alkyl trialkoxysilanes, dialkyl dialkoxysilanes, and trialkyl alkoxysilanes.

10. The sealer composition of claim 9, wherein said second silane is selected from the group consisting of n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, and hexadecyl triethoxysilane.

11. A cementitious structure comprising:
   a cementitious substrate; and
   a penetrating sealer applied to the surface of the cementitious substrate and at least partially penetrating into said substrate, the penetrating sealer comprising a substantially non-aqueous blend of:
   a first silane;
   a second silane having a higher molecular weight than said first silane; and
   at least one corrosion inhibitor, wherein said corrosion inhibitor is soluble in silane, and soluble in solvent-diluted silane, and at least partially soluble in water, and wherein said corrosion inhibitor comprises at least one of:
      (a) a blend of ethynylcarbinolalkoxylate and amine blocked C6-C10 alkyl phosphate monoester, or
      (b) a blend of dimethyl acetamide and triisobutyl phosphate.

12. The cementitious structure of claim 11, wherein said cementitious substrate is selected from the group consisting of concrete, masonry, and mortar substrates.

13. The cementitious structure of claim 12, wherein the molecular weight of said first silane is from about 150 g/mol to about 250 g/mol, and wherein the molecular weight of said second silane is from about 270 g/mol to about 400 g/mol.

14. The cementitious structure of claim 12, wherein the molecular weight of said first silane is from about 100 g/mol to about 270 g/mol, and wherein the molecular weight of said second silane is from about 270 g/mol to about 575 g/mol.

15. The cementitious structure of claim 14, wherein said first silane is selected from the group consisting of methyl trimethoxysilane, ethyl trimethoxysilane, n-butyl trimethoxysilane, isobutyl trimethoxysilane, methyl triethoxysilane, ethyl triethoxysilane, n-butyl triethoxysilane, and isobutyl triethoxysilane.

16. The cementitious structure of claim 14, wherein said second silane is selected from the group consisting of n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, and hexadecyl triethoxysilane.

17. The cementitious structure of claim 14, wherein said first silane comprises isobutyl triethoxysilane, and wherein said second silane comprises n-octyl triethoxysilane.

18. The cementitious structure of claim 14, wherein said corrosion inhibitor comprises a blend of ethynylcarbinolalkoxylate and amine blocked C6-C10 alkyl phosphate monoester.

19. The cementitious structure of claim 14, wherein said corrosion inhibitor comprises a blend of dimethyl acetamide and triisobutyl phosphate.

20. A method of sealing a steel reinforced cementitious structure from intrusion of corrosion-causing agents, comprising:
 applying to a surface of said structure to be sealed a penetrating sealer comprising a substantially non-aqueous blend of:
  a first silane;
  a second silane having a higher molecular weight than said first silane; and
  at least one corrosion inhibitor, wherein said corrosion inhibitor is soluble in silane, and soluble in solvent-diluted silane, and at least partially soluble in water, and wherein said corrosion inhibitor comprises at least one of:
   (a) a blend of ethynylcarbinolalkoxylate and amine blocked C6-C10 alkyl phosphate monoester, or
   (b) a blend of dimethyl acetamide and triisobutyl phosphate;
 and permitting the sealer composition to penetrate into the substrate.

21. A sealer composition for a cementitious substrate, comprising a substantially non-aqueous blend of:
 a first silane;
 a second silane having a higher molecular weight than said first silane; and
 at least one corrosion inhibitor, wherein said corrosion inhibitor is soluble in silane, and soluble in solvent-diluted silane, and at least partially soluble in water, and wherein said corrosion inhibitor comprises a blend of dimethyl acetamide and triisobutyl phosphate.

22. The sealer composition of claim 21, wherein the molecular weight of said first silane is from about 100 g/mol to about 270 g/mol.

23. The sealer composition of claim 21, wherein the molecular weight of said second silane is from about 270 g/mol to about 575 g/mol.

24. The sealer composition of claim 21, wherein the molecular weight of said first silane is from about 150 g/mol to about 250 g/mol, and wherein the molecular weight of said second silane is from about 270 g/mol to about 400 g/mol.

25. The sealer composition of claim 21, wherein the molecular weight of said first silane is from about 100 g/mol to about 270 g/mol, and wherein the molecular weight of said second silane is from about 270 g/mol to about 576 g/mol.

26. The sealer composition of claim 25, wherein said first silane comprises isobutyl triethoxysilane, and wherein said second silane comprises n-octyl triethoxysilane.

27. The sealer composition of claim 25, wherein said first silane is selected from the group consisting of alkyl trialkoxysilanes, dialkyl dialkoxysilanes, and trialkyl alkoxysilanes.

28. The sealer composition of claim 27, wherein said first silane is selected from the group consisting of methyl trimethoxysilane, ethyl trimethoxysilane, n-butyl trimethoxysilane, isobutyl trimethoxysilane, methyl triethoxysilane, ethyl triethoxysilane, n-butyl triethoxysilane, and isobutyl triethoxysilane.

29. The sealer composition of claim 25, wherein said second silane is selected from the group consisting of alkyl trialkoxysilanes, dialkyl dialkoxysilanes, and trialkyl alkoxysilanes.

30. The sealer composition of claim 29, wherein said second silane is selected from the group consisting of n-octyl trimethoxysilane, isooctyl trimethoxysilane, dodecyl trimethoxysilane, hexadecyl trimethoxysilane, n-octyl triethoxysilane, isooctyl triethoxysilane, dodecyl triethoxysilane, and hexadecyl triethoxysilane.

* * * * *